United States Patent [19]
Ha

[11] Patent Number: 6,081,307
[45] Date of Patent: Jun. 27, 2000

[54] LIQUID CRYSTAL DISPLAY DEVICE WITH SHORTING BAR CONNECTED WITH ASYMMETRICAL FLOATING GATE TRANSISTORS

[75] Inventor: Yong Min Ha, Kyungki-do, Rep. of Korea

[73] Assignee: LG Electronics Inc., Seoul, Rep. of Korea

[21] Appl. No.: 08/603,480

[22] Filed: Feb. 20, 1996

[30] Foreign Application Priority Data

Feb. 20, 1995 [KR] Rep. of Korea ............... 95-3240

[51] Int. Cl.[7] ............................................. G02F 1/1333
[52] U.S. Cl. ............................ 349/40; 349/41; 349/46
[58] Field of Search ......................... 349/40, 41, 46; 257/261, 409, 360, 361; 361/56, 134

[56] References Cited

U.S. PATENT DOCUMENTS

| | | | |
|---|---|---|---|
| 5,019,001 | 5/1991 | Abe et al. | 445/3 |
| 5,019,002 | 5/1991 | Holmberg | 445/24 |
| 5,041,888 | 8/1991 | Possin et al. | 257/411 |
| 5,195,010 | 3/1993 | Dresner | 361/56 |
| 5,396,083 | 3/1995 | Kim et al. | 257/59 |
| 5,504,348 | 4/1996 | Yoshida | 257/59 |
| 5,585,949 | 12/1996 | Yamazaki et al. | 349/41 |
| 5,652,632 | 7/1997 | Shimizu | 349/40 |
| 5,668,032 | 9/1997 | Holmberg et al. | 438/144 |
| 5,731,216 | 3/1998 | Holmberg et al. | 437/40 |
| 5,737,041 | 4/1998 | Holmberg et al. | 349/43 |
| 5,798,534 | 8/1998 | Young | 257/59 |

*Primary Examiner*—Kenneth Parker
*Attorney, Agent, or Firm*—Finnegan, Henderson, Farabow, Garrett & Dunner, L.L.P.

[57] ABSTRACT

A liquid crystal display device (LCD) is provided which includes a plurality of gate lines and a plurality of signal lines arranged perpendicular to each other. A common line is formed on the periphery of a display portion of the LCD, and a static electricity preventing device having a first floating gate structure is connected between the gate line and common line, and a second floating gate structure is connected between the signal line and common line.

15 Claims, 7 Drawing Sheets

F I G.11a
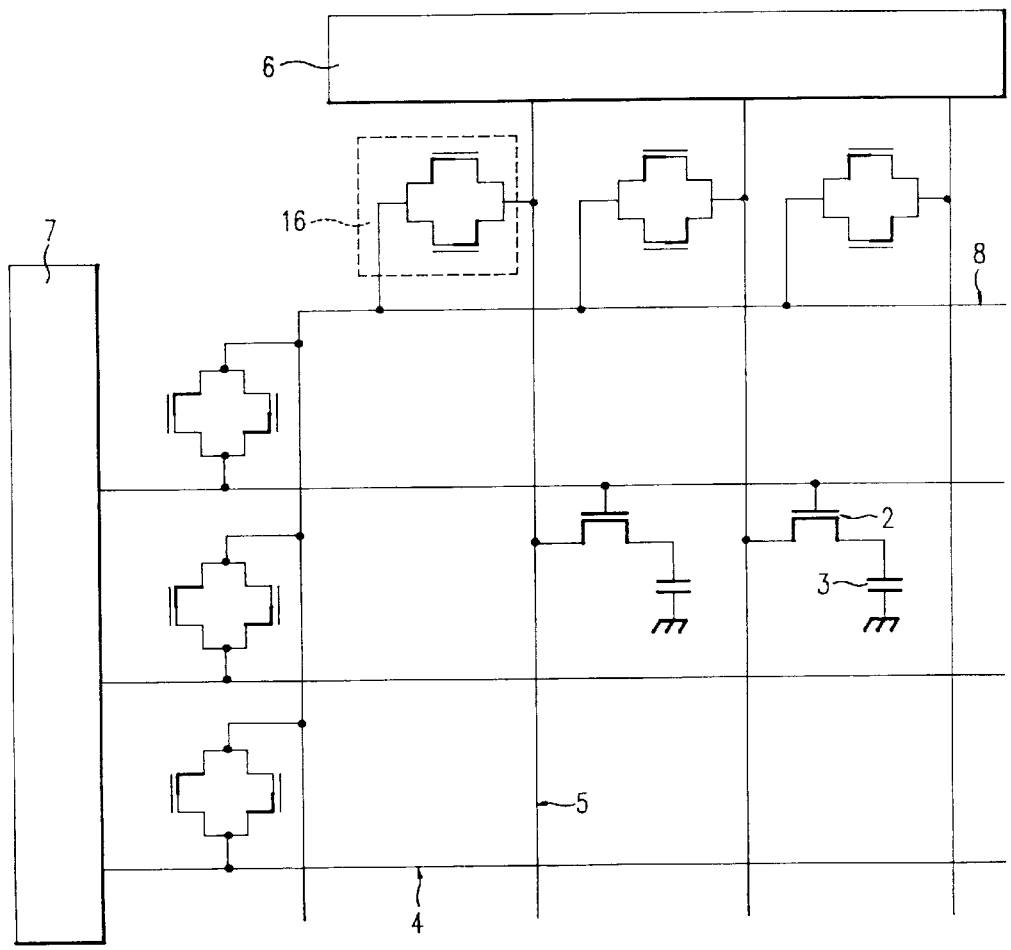

LIQUID CRYSTAL DISPLAY DEVICE WITH SHORTING BAR CONNECTED WITH ASYMMETRICAL FLOATING GATE TRANSISTORS

BACKGROUND OF THE INVENTION

The present invention relates to a liquid crystal display (LCD), and more particularly, to a static electricity breakdown preventing device which prevents an insulating layer of a thin film transistor (TFT) of the LCD from being destroyed due to static electricity.

FIG. 1 is a schematic block and equivalent circuit diagram of a conventional TFT-LCD. Referring to FIG. 1, a plurality of gate lines 4 and signal lines 5 are arranged perpendicular to each other. A pixel TFT 2 and a liquid crystal capacitor 3 are connected to each gate line 4 and signal line 5 at the intersection where gate line 4 and signal line 5 meet. The plurality of signal lines 5 and gate lines 4 are coupled to a data drive circuit 6 and gate drive circuit 7 formed around the pixel portion, respectively.

In the TFT-LCD constructed as above, electrostatic discharge can occur when a high static electric potential is coupled across signal line 5 and gate line 4. The discharge can destroy the insulating layer of the TFT during the LCD fabrication process. This may cause the device to fail. For the purpose of preventing electrostatic discharge, as shown in FIG. 1, a common line 8 is formed on the periphery of signal line 5 and gate line 4, and static electricity preventing circuit 1 is connected to each signal line and common line, and to each gate line and common line. By doing so, when the static electricity is induced, currents flow through static electricity preventing circuit 1 so that the same potential appears across signal line 5 and gate line 4, thereby preventing insulator breakdown.

FIG. 2 shows a conventional static electricity prevention circuit, consisting of a two-terminal thin film transistor circuit. The circuit includes the gate and two transistors 1A and 1B having their gates and drains respectively tied together.

The conventional static electricity prevention circuit has a current-voltage characteristic as shown in FIG. 3 when a voltage is applied across terminals (a) and (b). This static electricity preventing device operates in such a manner that at a relatively low voltage within a TFT-LCD operation voltage range, a small amount of current flows creating little signal disturbance. On the other hand, if a high voltage is generated, a significant amount of current flows.

However, the conventional static electricity preventing circuit becomes inoperable if one of the two transistors is defective. TFT's typically become defective due to poor gate insulation which causes a high leakage current between the gate and source or drain. In the conventional static electricity preventing circuit, in the event that the gate insulating layer fails, the gate and signal lines are shorted and, consequently, the pixel located at that gate and signal line becomes defective. In addition, the entire pixel and row in which the defective pixel is located do not operate properly.

Furthermore, for a signal level above its threshold voltage, current flows even if the signal voltage is low. This is because the conventional static electricity preventing circuit has a structure in which the gate and drain are connected to each other. Accordingly, a driving circuit having a very high current supply capacity is required. Otherwise, the signal voltage is distorted.

SUMMARY OF THE INVENTION

It is an object of the present invention to provide a liquid crystal display device having a static electricity preventing device which has a simple structure and excellent performance in order to prevent its malfunction due to insulation destruction caused by static electricity produced during TFT-LCD fabrication.

To accomplish the object of the present invention, there is provided a liquid crystal display device constructed in such a manner that a static electricity preventing device comprises: a semiconductor layer doped at predetermined intervals, and an intrinsic semiconductor layer serving as a channel region is formed between the doped semiconductor layers. A floating gate is further provided on the doped semiconductor and intrinsic semiconductor layers and spaced therefrom by an insulating layer. The insulating is also connected between metal lines.

BRIEF DESCRIPTION OF THE DRAWINGS

FIGS. 11a and 11b are schematic block and equivalent circuit diagrams of the second embodiment of a TFT-LCD having a static electricity preventing device according to the present invention.

DETAILED DESCRIPTION OF THE INVENTION

Preferred embodiments of the present invention will be explained below with reference to the accompanying drawings. Wherever possible, the same reference numbers will be used throughout the drawings to refer to the same or like parts.

Figure 1:
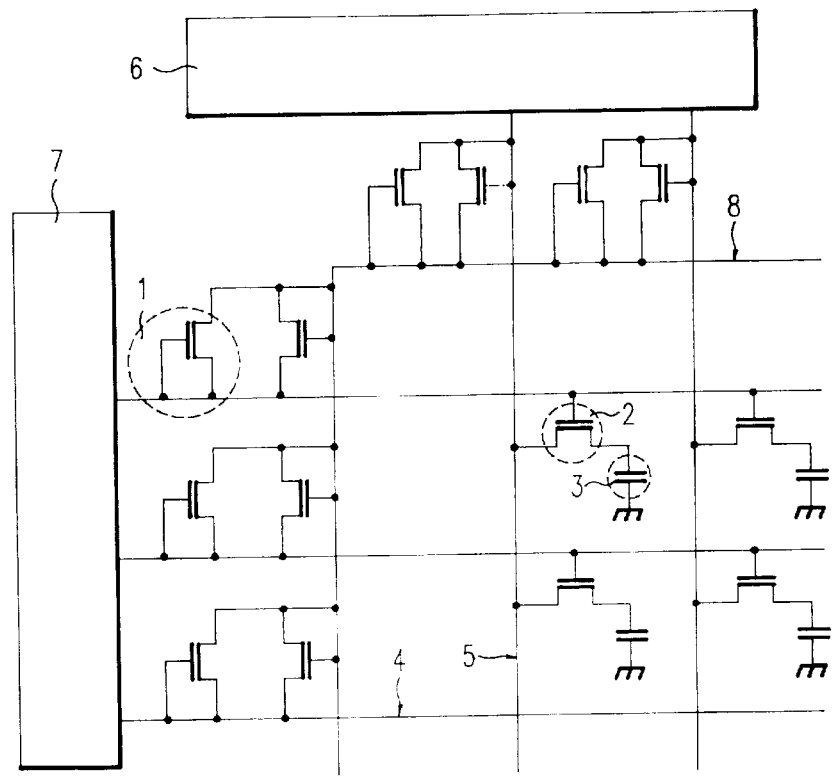
FIG. 1 is a schematic block and equivalent circuit diagram of a conventional TFT-LCD.
Figure 2:
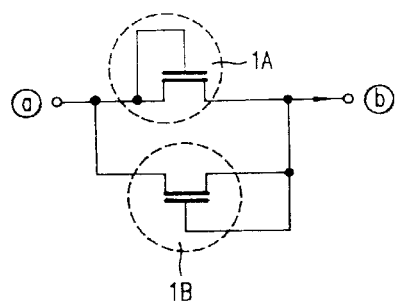
FIG. 2 is a static electricity preventing circuit of the conventional TFT-LCD.
Figure 3:
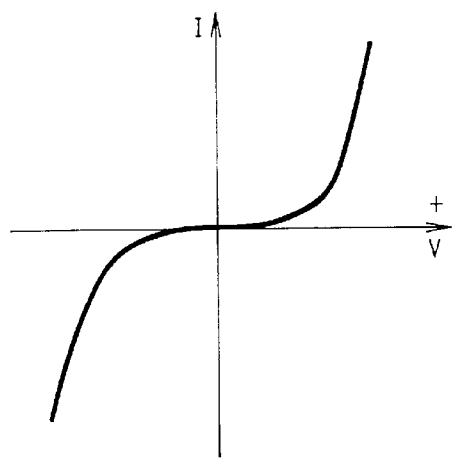
FIG. 3 illustrates a current-voltage characteristic curve of a static electricity preventing circuit of the conventional TFT-LCD.
Figure 4A:
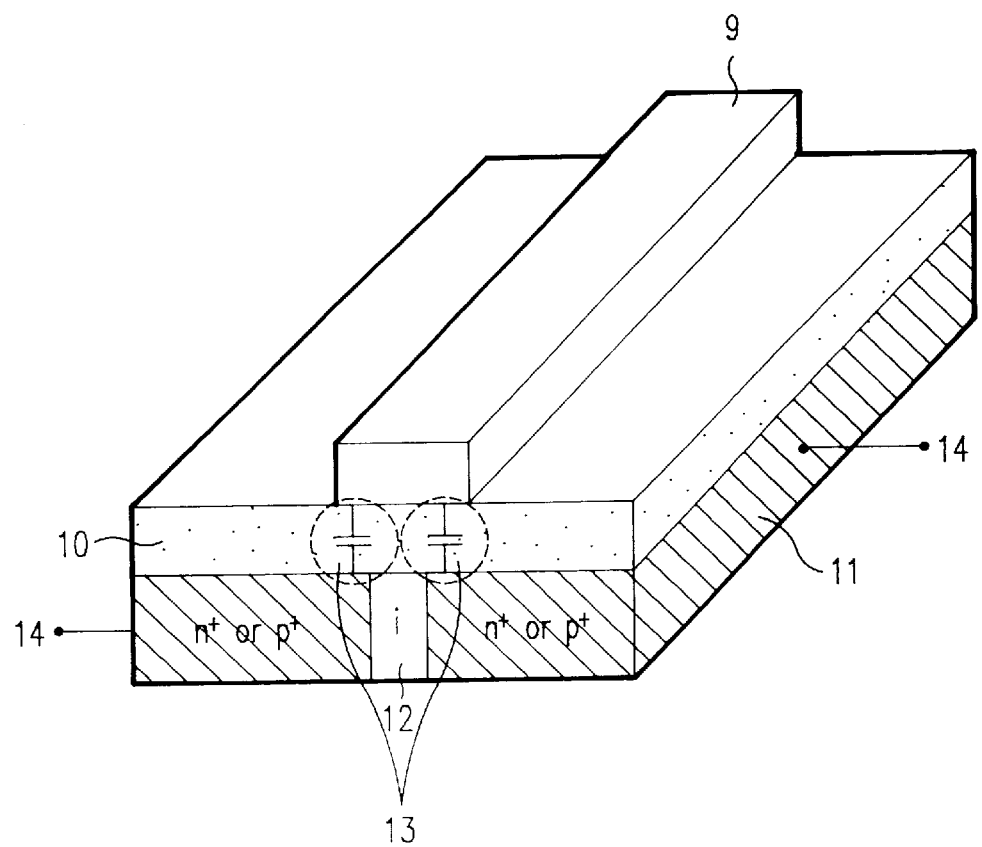
FIGS. 4A and 4B are a perspective view and an equivalent circuit diagram, respectively, of a static electricity preventing device according to the present invention, respectively.

As shown in FIG. 4A, a static electricity preventing device of a TFT-LCD of the present invention has a structure in which an intrinsic semiconductor layer 12 is formed between an $n^+$ or $p^+$ doped semiconductor layer, which will form a source and drain in the completed device. An insulating layer 10 is formed on intrinsic semiconductor layer 12 and the heavily doped semiconductor layers, and a floating gate 9 is provided on insulating layer 10 overlying intrinsic semiconductor layer 12. The structure of the ESD (electrostatic discharge) preventing device of the present invention is similar to that of the conventional transistor, but includes a floating gate MOS structure, as discussed in more detail below.

While the conventional static electricity preventing device, as described above, has a structure in which two transistors whose gate and drain are connected to each other, the static electricity preventing device of the present invention has a similar structure to that of an MOS TFT but uses a simpler structure in which floating gate 9 is made to float and only two connecting terminals 14 of doped semiconductor layer 11 are used. Reference number 13 denotes a superposed parasitic capacitance (parasitic capacitance generated by superposition of floating gate and source/drain of $n^+$ or $p^+$ layers).

Figure 4B:
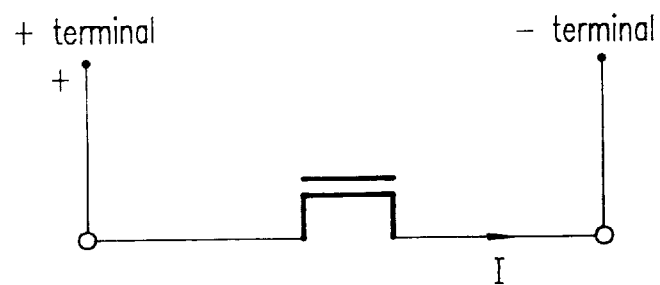

FIG. 4B is an equivalent circuit diagram of the static electricity preventing device shown in FIG. 4A.

Figure 5:
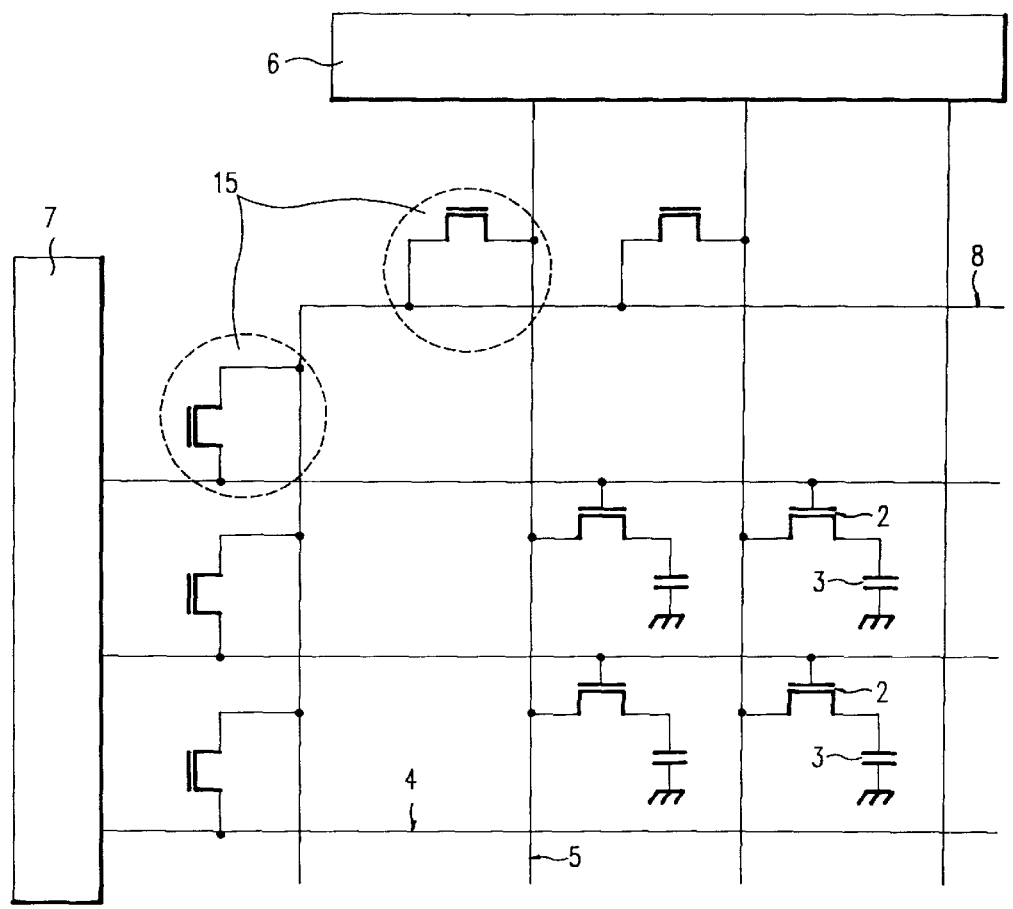
FIG. 5 is a schematic block diagram and equivalent circuit diagram of a TFT-LCD having a static electricity preventing device of the present invention.

Referring to FIG. 5, static electricity preventing device 15 of the present invention consisting of a transistor having a floating gate is connected between a common line and each signal line 5, and between the common line and each gate line 4.

Figure 6:
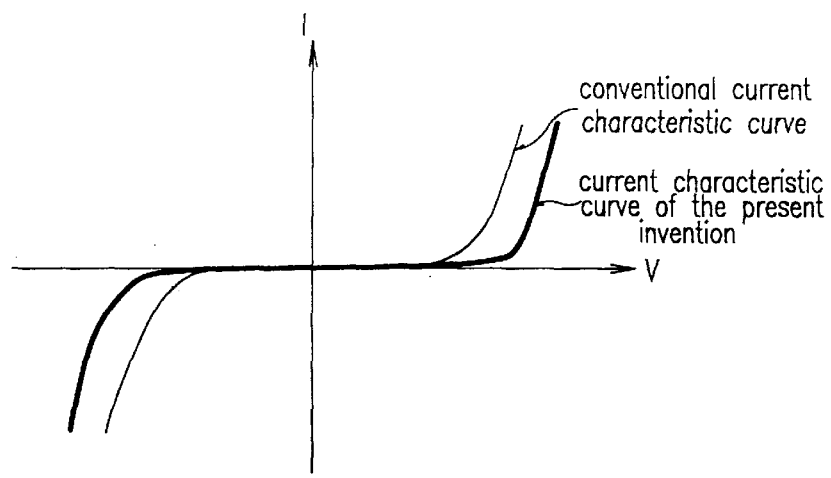
FIG. 6 is a current-voltage characteristics curve of a static electricity preventing device of the present invention.

The operation of the static electricity preventing device of the present invention will be explained below with reference to FIG. 6 which shows a comparison of voltage-current characteristics of the conventional static electricity preventing device and the present invention.

When an LCD operates normally, within a voltage range of the signals supplied from the driving circuit, a slight amount of current flows. Accordingly, lines are opened, which are, however, supposed to be connected to both terminals of the static electricity preventing device, having no effect on signal voltage. If a high voltage is induced by static electricity, the potential difference between the two lines disappears because currents flow through both terminals of the static electricity preventing device. This prevents the insulating layer from being destroyed due to static electricity.

Unlike the conventional static electricity preventing device, the static electricity preventing device of the present invention consists of a single transistor, simplifying its fabrication process and improving the yield.

Moreover, even if a significant amount of current flows between the doped semiconductor layer and floating gate due to partial malfunction of the gate insulating layer of the static electricity preventing device, a short between the signal line and gate line does not occur, having no effect on the operation of pixel.

Figure 7A:
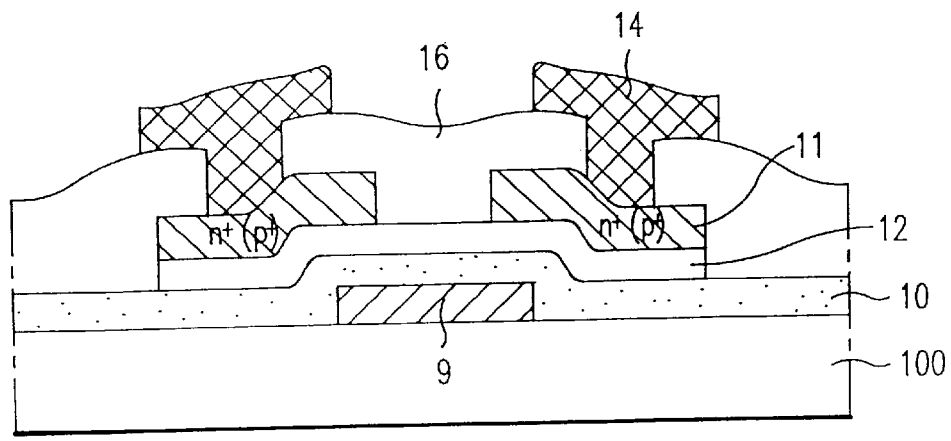
FIGS. 7A and 7B are cross-sectional views of one embodiment of a static electricity preventing device according to the present invention.
Figure 7B:
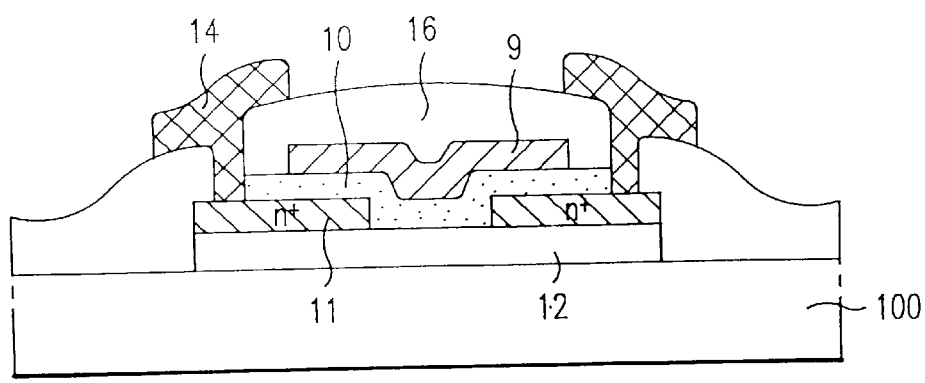

FIGS. 7A and 7B show a static electricity preventing device of the present invention embodiment using a typical inverted staggered-type transistor structure.

Referring to FIG. 7A showing the static electricity preventing device consisting of a thin film transistor having a bottom gate structure, wherein a floating gate 9 is formed on a substrate 100. An intrinsic semiconductor layer 12 is formed on the floating gate, having a gate insulating layer 10 therebetween. A doped semiconductor layer 11, constituting a source and drain, is formed on the intrinsic semiconductor layer 12, and provided at predetermined intervals on the substrate. In addition, metal electrodes serving as connecting terminals 14 respectively contact doped semiconductor layer 11 through a contact hole which is formed in a predetermined portion of an insulating layer 16.

FIG. 7B shows a static electricity preventing device having a TFT top gate structure. The top gate structure includes an intrinsic semiconductor layer 12 formed on a substrate 100, and a doped semiconductor layer 11 to be a source and drain formed on the intrinsic semiconductor layer at predetermined intervals. A floating gate 9 is formed on the doped semiconductor layer 12, having a gate insulating layer 10 therebetween, and metal electrodes serving as terminals 14 contact doped semiconductor layer 11 through a contact hole which is formed in a predetermined portion of an insulating layer 16 overlying floating gate 9.

Figure 8:
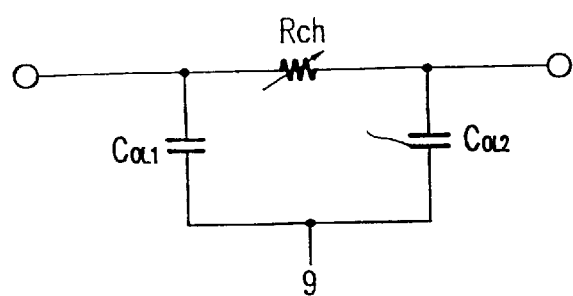
FIG. 8 is an equivalent circuit diagram of the first embodiment of static electricity preventing device according to the present invention.

FIG. 8 shows an equivalent circuit diagram of the static electricity preventing device of the present invention. At the low signal voltage, resistance Rch of intrinsic semiconductor layer 12 is large, which results in little current flow. In case that voltage V is applied to both terminals of the device, voltage Vg induced to the floating gate can be given by the following equation.

$$Vg = C_{OL1}/(C_{OL1} + C_{OL2}) \times V$$

Here, $C_{OL1}$ and $C_{OL2}$ are superposed parasitic capacitance generated between the doped semiconductor layer, which is formed on both sides of the intrinsic semiconductor layer, and the floating gate metal.

When voltage Vg is induced, electrons or holes are induced in intrinsic semiconductor layer 12 to form a channel, and a large current flows at a voltage above the threshold voltage of the device. The threshold voltage becomes higher than that of the conventional static electricity preventing device having a structure in which the gate and drain are connected. Therefore, the threshold voltage of the static electricity preventing device varies with the superposed or overlap area of floating gate 9 and doped semiconductor layer 11.

Because the conventional static electricity preventing device has a low threshold voltage, leakage current at low signal voltage levels is relatively large. Accordingly, if the current driving capacity of the external driving circuit is not very high, the signal supplied to the pixel may be distorted. However, the static electricity preventing device of the present invention improves its threshold voltage, to thereby reduce current driving capacity. This decreases the driving power of the LCD.

Figure 9:
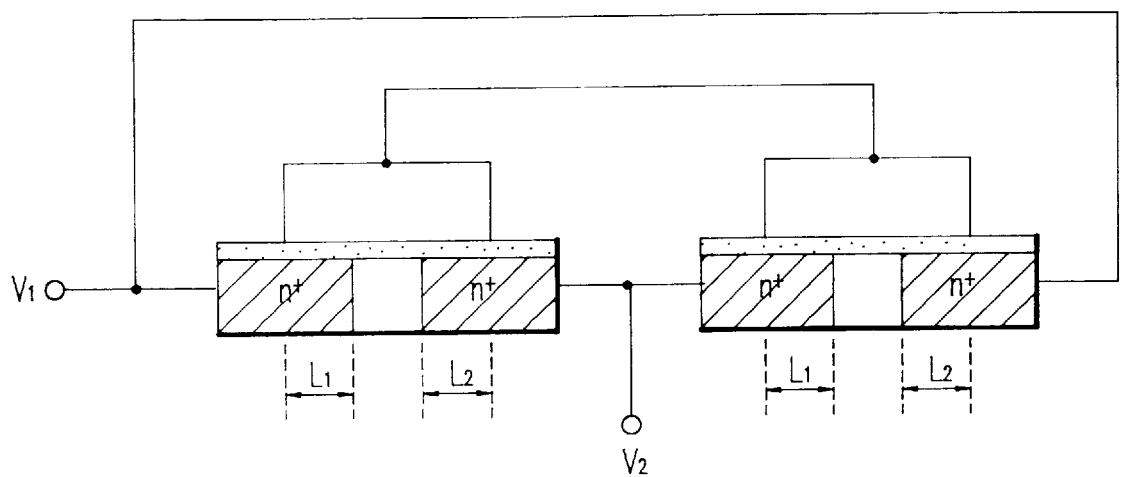
FIG. 9 is a cross-sectional view of another embodiment of a static electricity preventing device of the present invention.

The superposed parasitic capacities $C_{OL1}$ and $C_{OL2}$ may be different from each other in order to control threshold voltage, as shown in FIG. 9. In addition, the static electricity preventing device may have a symmetric construction in such a manner that two transistors are connected in parallel.

Figure 10:
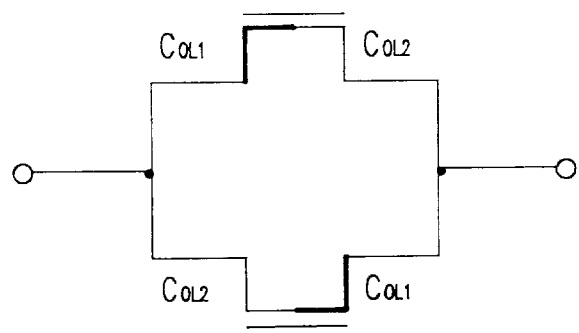
FIG. 10 is an equivalent circuit diagram of the second embodiment of a static electricity preventing device according to the present invention.

In FIG. 9, $L_1$ and $L_2$ show a superposed width of the doped semiconductor layer and the floating gate. FIG. 10 is an equivalent circuit diagram of FIG. 9.

Figure 11B:
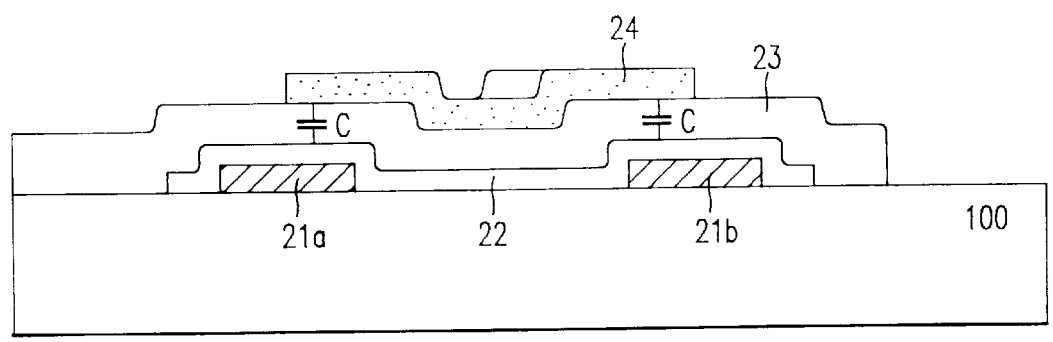

As shown in FIGS. 11a and 11b, the static electricity preventing circuit may be constructed in an LCD, using the static electricity preventing devices connected in parallel.

In the static electricity preventing device of the present invention, in order to make a large current flow at a high voltage caused due to static electricity, intrinsic semiconductor layer 12 (channel length) is shortened. This makes both ends of doped semiconductor layer 11 fully depleted, resulting in punchthrough.

In accordance with another embodiment of the present invention, a doped semiconductor layer may be employed instead of the metal gate. Alternatively, the static electricity preventing device may be donstructed with $n^+$ semiconductor layer/intrinsic semiconductor layer/$n^+$ semiconductor or $p^+$ semiconductor layer/intrinsic semiconductor layer/$p^+$ semiconductor structures, using only punchthrough characteristics and without the metal gate.

In accordance with yet a further embodiment of present invention, only the metal pattern is introduced as the source/ drain region instead of heavily doped n-type semiconductor as shown in FIG. 11b. In this case, the static electricity preventing device (ESD preventing device) includes two metal layers 21 and 24, an undoped semiconductor layer 22 and an insulator layer 23. Since the electrical potential of floating layer 24 can not be lower than that of the source 21 of the ESD preventing device, the n-type doped semiconductor layer is not needed between source/drain electrode 21 and undoped semiconductor layer 22. The operation of this device is same as that of an ESD preventing device with $n^+$ doped semiconductor.

According to the present invention described above, the static electricity preventing device having excellent performance is realized in a simplified structure, preventing insulation destruction caused due to static electricity during TFT-LCD fabrication. Even in case that the static electricity preventing device is poor, display characteristics are unaffected, thereby improving the yield during TFT-LCD fabricating process.

What is claimed is:

1. A liquid crystal display device having a display portion, said liquid crystal comprising:
   a plurality of gate lines in said display portion;
   a plurality of signal lines in said display portion, said plurality of gate lines and plurality of signal lines are arranged perpendicular to each other;
   a common line provided in a peripheral portion of said display portion; and
   a static electricity preventing circuit including a first transistor having a floating gate, said first transistor connected between said common line and said one of said plurality of gate lines, and a second transistor having a floating gate, said second transistor connected between said common line and said one of said plurality of signal lines,
   said first transistor and said second transistor each further including:
      a first doped semiconductor layer overlapping a first edge portion of said floating gate, and
      a second doped semiconductor layer, said second doped semiconductor layer overlapping a second edge portion of said floating gate, wherein said first doped semiconductor layer and said first edge portion of said floating gate form a first capacitance therebetween, and wherein said second doped semiconductor layer and said second edge portion of said floating gate form a second capacitance therebetween different from said first capacitance.

2. A liquid crystal display device in accordance with claim 1, wherein said static electricity preventing circuit is connected to each of said plurality of gate lines, and a plurality of floating gates corresponding in number to said plurality of gate lines are provided between each of said plurality of gate lines and said common line.

3. A liquid crystal display device in accordance with claim 1, wherein said static electricity preventing circuit further includes a floating gate MOS structure comprising:
   an intrinsic semiconductor layer having an upper surface;
   first and second doped semiconductor regions separated by said intrinsic semiconductor layer; and
   an insulating layer provided on said upper surface of said intrinsic semiconductor layer,
   wherein said floating gate is provided on said insulating layer and completely covers said intrinsic semiconductor layer and overlaps a first predetermined portion of said first doped semiconductor region and a second predetermined portion of said second doped semiconductor region.

4. A liquid crystal display device in accordance with claim 3, wherein said first predetermined portion in said floating gate MOS structure has a length different than a length of said second predetermined portion, said static electricity preventing circuit further comprising:
   a plurality of said MOS floating gate structures, said plurality of said MOS floating gate structures being grouped in a plurality of pairs, wherein said MOS floating gate structures in each of said plurality of pairs is connected to one another in parallel.

5. A liquid crystal display device having a display portion, said liquid crystal comprising:
   a plurality of gate lines in said display portion;
   a plurality of signal lines in said display portion, said plurality of gate lines and plurality of signal lines are arranged perpendicular to each other;
   a common line provided in a peripheral portion of said display portion; and
   a static electricity preventing circuit including a transistor having a floating gate, said transistor connected between said common line and said one of said plurality of gate lines,
   wherein said transistor further includes:
      a first doped semiconductor layer, said first doped semiconductor layer overlapping a first edge portion of said floating gate, and
      a second doped semiconductor layer, said second doped semiconductor layer overlapping a second edge portion of said floating gate, wherein said first doped semiconductor layer aid said first edge portion of said floating gate form a first capacitance therebetween, and wherein said second doped semiconductor layer and said second edge portion of said floating gate form a second capacitance therebetween different from said first capacitance.

6. A liquid crystal display device in accordance with claim 5, wherein said static electricity preventing circuit is connected to each of said plurality of gate lines, and a plurality of floating gates corresponding in number to said plurality of gate lines are provided between each of said plurality of gate lines and said common line.

7. A liquid crystal display device in accordance with claim 5, wherein said static electricity preventing circuit further includes a floating gate MOS structure comprising:
   an intrinsic semiconductor layer having an upper surface;
   first and second doped semiconductor regions separated by said intrinsic semiconductor layer; and
   an insulating layer provided on said upper surface of said intrinsic semiconductor layer,
   wherein said floating gate is provided on said insulating layer and completely covers said intrinsic semiconductor layer and overlaps a first predetermined portion of said first doped semiconductor region and a second predetermined portion of said second doped semiconductor region.

8. A liquid crystal display device in accordance with claim 7, wherein said first predetermined portion in said floating gate MOS structure has a length different than a length of said second predetermined portion, said static electricity preventing circuit further comprising;
   a plurality of said MOS float gate structures, said plurality of said MOS floating gate structures being grouped in a plurality of pairs, wherein said MOS floating gate structures in each of said plurality of pairs is connected to one another in parallel.

9. A liquid crystal display device having a display portion, said liquid crystal comprising:

a plurality of gate lines in said display portion;

a plurality of signal lines in said display portion, said plurality of gate lines and plurality of signal lines are arranged perpendicular to each other;

a common line provided in a peripheral portion of said display portion; and a static electricity preventing circuit including a transistor having a floating gate, said transistor connected between said common line and one of said plurality of signal lines, wherein said transistor further includes:

a first doped semiconductor layer, said first doped semiconductor layer overlapping a first edge portion of said floating gate, and a second doped semiconductor layer, said second doped semiconductor layer overlapping a second edge portion of said floating gate, wherein said first doped semiconductor layer and said first edge portion of said floating gate form a first capacitance therebetween, and wherein said second doped semiconductor layer and said second edge portion of said floating gate form a second capacitance therebetween different from said first capacitance.

10. A liquid crystal display device in accordance with claim 9, wherein said static electricity preventing circuit is connected to each of said plurality of signal lines, and a plurality of floating gates corresponding in number to said plurality of signal lines are provided between each of said plurality of signal lines and said common line.

11. A liquid crystal display device in accordance with claim 9, wherein said static electricity preventing circuit further includes a floating gate MOS structure comprising:

an intrinsic semiconductor layer having an upper surface;

first and second doped semiconductor regions separated by said intrinsic semiconductor layer; and an insulating layer provided on said upper surface of said intrinsic semiconductor layer, wherein said floating gate is provided on said insulating layer and completely covers said intrinsic semiconductor layer and overlaps a first predetermined portion of said first doped semiconductor region and a second predetermined portion of said second doped semiconductor region.

12. A liquid crystal display device in accordance with claim 11, wherein said first predetermined portion in said floating gate MOS structure has a length different than a length of said second predetermined portion, said static electricity preventing circuit further comprising:

a plurality of said MOS float gate structures, said plurality of said MOS floating gate structures being grouped in a plurality of pairs, wherein said MOS floating gate structures in each of said plurality of pairs is connected to one another in parallel.

13. A liquid crystal display device having a display portion, comprising:

a plurality of gate lines in said display portion;

a plurality of signal lines in said display portion, said plurality of gate lines and plurality of signal lines being perpendicular to each other;

a common line in a peripheral portion of said display portion; and a static electricity preventing circuit including a first pair of parallelly connected transistors each having a floating gate, said first transistor pair connected between said common line and said one of said plurality of gate lines, and a second pair of parallelly connected transistors each having a floating gate, said second transistor pair connected between said common line and one of said plurality of signal lines, wherein said first doped semiconductor layer and said first edge portion of said floating gate form a first capacitance therebetween, and wherein said second doped semiconductor layer and said second edge portion of said floating gate form a second capacitance therebetween different from said first capacitance.

14. A liquid crystal display device having a display portion, comprising:

a plurality of column lines in said display portion;

a plurality of row lines in said display portion, wherein said plurality of column lines and said plurality of display lines are arranged perpendicular to each other;

a common line provided in a perpendicular portion of said display portion;

a static electricity preventing circuit having a transistor, and coupled between said common line and at least one of said plurality of column lines and said plurality of row lines, the transistor including:

a source electrode;

a drain electrode; and a floating gate, wherein said floating gate overlaps a part of said source electrode and a part of said drain electrode, and wherein said overlapping between said part of said source electrode and said floating gate forms a first capacitance therebetween and said part of said drain electrode and said floating gate forms a second capacitance therebetween different from said first capacitance.

15. A liquid crystal display device in accordance with claim 14, wherein said electricity preventing device includes a pair of parallelly connected transistors coupled between said common line and at least one of said plurality of column lines and said plurality of row lines.

* * * * *